United States Patent [19]

Hull

[11] Patent Number: 4,926,771
[45] Date of Patent: May 22, 1990

[54] VARIABLE HULL RESISTANCE SYSTEM FOR MARINE VESSELS

[76] Inventor: Francis R. Hull, 567 E. 26th St., Brooklyn, N.Y. 11210

[21] Appl. No.: 369,340

[22] Filed: Jun. 21, 1989

[51] Int. Cl.$^5$ .............................................. B63B 1/22
[52] U.S. Cl. .................... 114/61; 114/289; 114/291
[58] Field of Search ............... 114/61, 289, 56, 283, 114/288, 291

[56] References Cited

U.S. PATENT DOCUMENTS

| | | | |
|---|---|---|---|
| 3,066,753 | 12/1962 | Hurley et al. | 114/289 |
| 3,382,833 | 5/1968 | Wukowitz | 114/289 |
| 3,477,400 | 11/1969 | Walker | 114/289 |
| 3,760,756 | 9/1973 | Boden | 114/289 |
| 3,903,832 | 9/1975 | Ishida | 114/289 |
| 4,494,477 | 1/1985 | Matthews | 114/61 |

Primary Examiner—Sherman D. Basinger
Assistant Examiner—Stephen P. Avila

[57] ABSTRACT

Methods and apparatuses for both reducing and increasing water-side drag of marine vessels are disclosed, to enhance vessel operation and control. The hull of a marine vessel employing the invention would be sectionally constructed, to form a rigid structure. A short central bow section terminating in a primary lateral hydrodynamic step and a longer adjacent aft central hull section are disposed between narrow outboard hull sponsons having large length-to-width aspect ratios which provide substantial buoyant support for the vessel, enclosing an open-channel conduit under the vessel's aft central hull section. Outer water-side surfaces of the elongate outboard hull sponsons are contoured similarly to common racing shells and finished smooth, to delay or prevent flow separation and pressure drag. A shallow-draft aft central hull section having a shingled multi-step bottom surface abuts the central bow section adjacent the primary lateral step. A forced ventilation system provides a continuous air supply under the aft central hull section adjacent the primary lateral step during ahead propulsion, forming a lateral dynamic plenum which occupies its separation zone. A thick layer of air bubbles flows adjacent the shingled bottom surfaces of the aft central hull section during ahead propulsion, preventing flow separation and water-side pressure drag. When ventilation air supply is stopped during ahead propulsion, water-side flow separations develop large pressure drag forces on the vessel's hull, effectively braking the vessel's forward speed. The invention's teachings may be applied to the design of high-speed buoyantly supported marine vessels of all types, including both small craft and large ocean-going vessels.

5 Claims, 1 Drawing Sheet

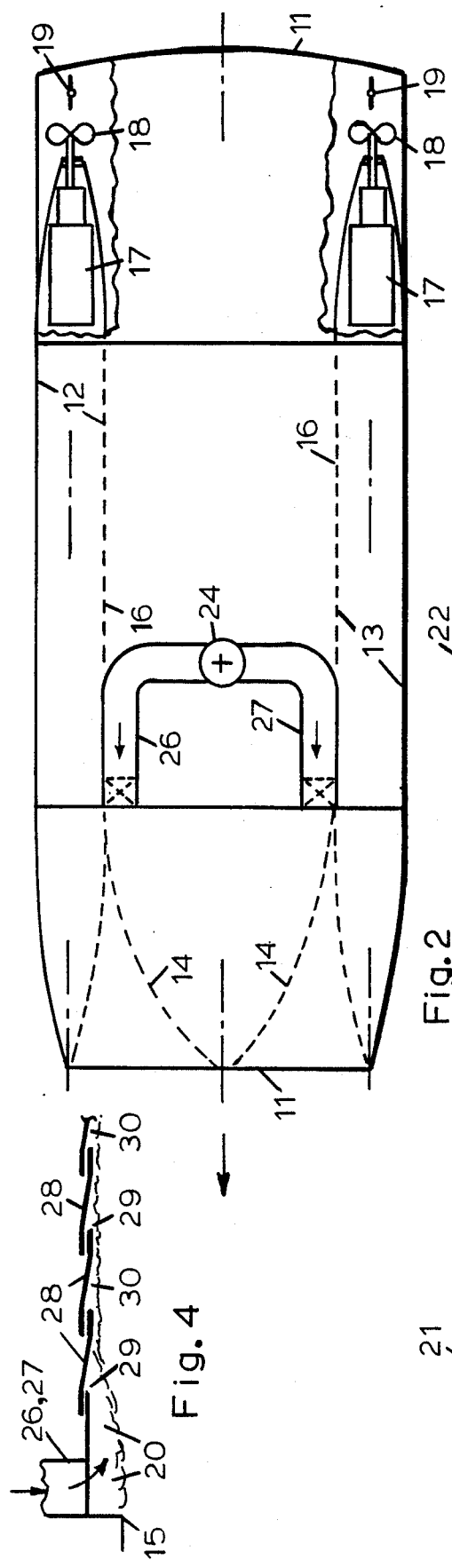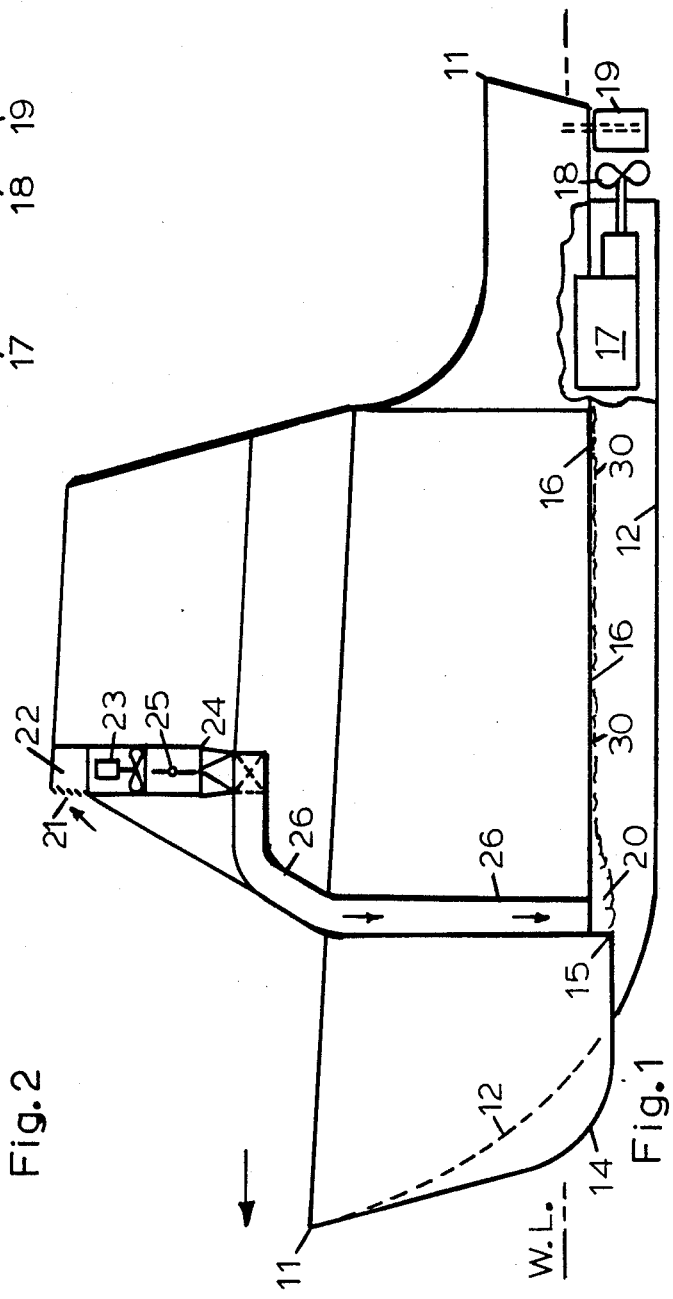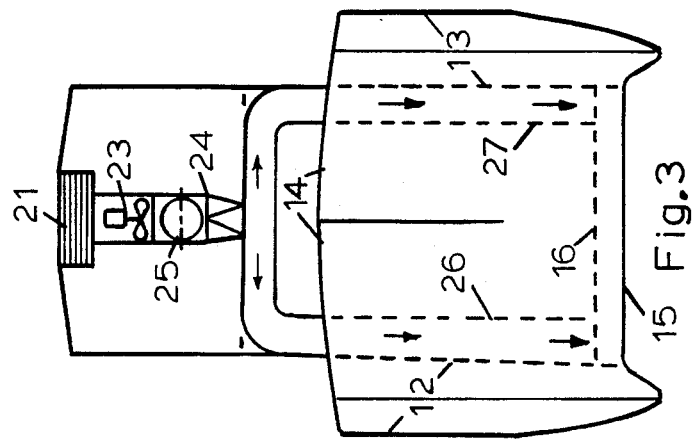

VARIABLE HULL RESISTANCE SYSTEM FOR MARINE VESSELS

This invention discloses means for varying the hull resistance of buoyantly-supported marine vessels, wherein viscous water drag resistances may be either decreased or increased to enhance the operations of a vessel.

Drag forces exerted on the structure of a moving surface marine vessle include both air drag and water drag. While drag forces due to relative flow of air over exposed surfaces of hull and superstructure are not insignificant, water drag resistances may be as much as 850 times greater than air drag (due to the greater density of water). The wetted outer hull of a moving marine vessel is the boundary against which water drag forces act, substantially against the direction of vessel motion. The outer hull of many marine vessels is streamlined to the greatest extent consistent with vessel function, often beginning with a pointed stem and finishing with a narrowed tapering stern section.

Water drag resistances against the movement of a marine vessel substantially act against the thrust developed by its propelling means, and are nominally comprised of both skin friction and pressure drag. Skin friction drag is caused by shearing forces in a relatively narrow boundary layer of moving water adjacent the vessel's hull, and is substantially limited to a region upstream of the point where fluid streamlines separate from the vessel's hull. Just downstream of a separation point, an adverse pressure gradient in the boundary layer acts with friction drag to substantially reduce momentum and cause backflow eddy currents adjacent the hull boundary. The fluid flow region downstream of the separation points on a vessel's hull is known as wake, which is ordinarily visible at the water's surface. Separation and wake prevents conversion of kinetic energy to pressure energy in the boundary layer, and typically causes a plethora of random eddy currents in a slow-moving volume of water which must effectively be dragged along by a moving vessel. This latter condition is known as pressure drag, which ordinarily comprises a substantial part of all fluid resistances acting against the propulsor of a moving vessel.

Separation of water flow streamlines adjacent a moving vessel's hull also occurs downstream of surface discontinuities such as fittings, external pipes and ducts, scoops, ship plate laps and protective covers. Separation phenomenae may include eddy currents and vortexes rotating about axes parallel to the trailing surface of discontinuities, and can occur in horizontal, vertical and intermediate planes which are not discernable by surface observation. Separation abaft all such wetted hull discontinuities produces both wake and water-side pressure drag.

The large pressure drag typically encountered by a marine vessel during ahead propulsion is substantially caused by fluid flow separations from wetted surfaces of the vessel's hull form, appendages and other discontinuities as it propels itself through surface waters. This large water-side pressure drag resistance acts against the thrust developed by the vessel's propelling means, causing substantial energy losses and increased fuel consumption.

"It is quite possible that the long racing and war canoes, hollowed out of logs, the long kayak, the long Indian canoe, and the modern racing shell are the only types of man-made craft which, in hull and appendages, were or are practically free of separation." (Hydrodynamics In Ship Design by Harold E. Saunders, Vol. I; Sec. 23.1, pp 324; Society of Naval Architects and Marine Engineers, 1957; New York, N.Y.). Vessels having a smooth carefully streamlined hull, with a large length-to-width aspect ratio, narrow width, and width-to-depth ratio near unity may be designed nearly free of hull separation and pressure drag.

Surface sea waters with wind-driven waves may be both a significant emulsion with entrained air, and a salt water solution nearly saturated with dissolved air. When a high-speed vessel is pitching, air may become entrapped under the bow and continue to pass along beneath the ship. Vertical core vortexes formed in turbulent flow adjacent the hull of a moving vessel may have air cores, and continually siphon air into subsurface water. Entrained air may be released by subsurface water into low-pressure separation zones abaft discontinuities, such as the bluff trailing surfaces of aft-facing plate laps.

Prior hydrodynamic experiences with high-speed marine vehicles includes the design of steps, which are lateral discontinuities having bluff trailing surfaces which are formed into the bottom of a planing hull. These lateral steps in the bottom surfaces of planing hulls are deliberately intended to develop a large ventilated separation zone downstream of the bluff trailing surfaces while the vehicle is in motion. The high-speed vehicles are designed to rise onto the steps of the planing form by dynamic lift, and occurs at critical operating speeds. When a high-speed planing vehicle is riding on its steps, water drag is substantially reduced, since a smaller surface of the planing form is in actual contact with the water surface. To prevent a large water pressure drag from retarding forward movement, air is liberally admitted into the separation zone downstream of the lateral steps. During planing of high-speed vehicles such as flying boats and seaplanes, air flows laterally under the planing hull from both sides into the separation zones, as the craft gains forward speed. Without separation zone ventilation, high-speed craft such as flying boats and seaplanes would be unable to rise fully onto their steps, and the large resulting pressure drag would likely prevent the vehicles from gaining sufficient speed for take-off.

Air-cushion vehicles are commonly supported by a 4–8 foot thick cushion of air within a lower flexible skirt enclosure, supplied from the discharge of a large fan. The craft normally travels with the bottom of the flexible skirt several inches above an earth or water surface, where a continuous peripheral discharge of the supporting air stream occurs. Many air-cushion vehicles are horizontally propelled by separate axial-type propeller fans. Air-cushion vehicles typically operate at greater speeds than marine vessels, since they do not encounter viscous water drag resistances while in motion. However air-cushion vehicles have operating costs substantially greater than those of marine vessels, because air-cushion vehicles must expend considerable energy to physically support the craft above an operating surface, while marine vessels are buoyantly supported at no cost.

Substantial low pressures may be developed in the separation zone abaft the bluff trailing surfaces of an enclosed hydrodynamic step in high-speed flow. This low-pressure is proportional to the square of fluid velocity, in accordance with the famous Toricelli theorem. For a vessel traveling at 30 nautical miles per hour in sea water, the absolute velocity pressure within an enclosed step separation zone would be equivalent to about 39.8 feet of sea water or about 17.69 psia! (This low pressure is partly counteracted by the absolute pressure at the immersion depth.).

It is time consuming to slow or stop a large heavily-laden marine vessel from a high operating speed, due to the inertia of the ship and its contents. Stopping a large heavily loaded ship traveling at high speed, by operating the propellers at full-speed astern during an emergency, often cannot be accomplished before the vessel makes a forward traverse of 8-10 or more nautical miles! Smaller vessels such as motorboats are often destroyed or damaged because operators are unable to rapidly slow the craft from an excessive forward speed. Development of effective means to rapidly slow marine vessels from high speed to a slower safe speed would benefit the operation of all buoyantly-supported marine vessels.

Development of effective means for reducing water-side flow separation, wake formation and pressure drag would greatly benefit the operation of buoyantly-supported marine vessels. These benefits would include reduced fuel consumption and increased vessel operating speeds.

The primary object of the invention is to develop means for substantially reducing the large water-side pressure drag resistances commonly encountered by buoyantly-supported marine vessels while underway.

Another important object is to develop smooth buoyant sponsons for marine vessels which substantially support the vessel structure, the buoyant sponsons having a large length-to-width aspect ratio and relatively narrow width, to limit separation and pressure-drag resistances of the wetted hull.

Another object is to develop configurations of a primary lateral hydrodynamic step disposed between smooth longitudinal outboard sponsons of a buoyantly-supported marine vessel, to enclose a central downstream hull section whose bottom surfaces include a series of smaller multiple hydrodynamic steps, which may entrap air into their trailing separation zones.

Yet another important object is to develop means for the forced ventilation of the large separation zone abaft a primary lateral step disposed between longitudinal outboard sponsons of a buoyantly-supported marine vessel, to provide a thick layer of air bubbles which covers the downstream bottom surfaces of a central multi-step hull section, while the craft is underway.

A further object is to develop means for reducing water-side pressure drag of a moving buoyantly-supported marine vessel, by use of a series of ventilated enclosed hydrodynamic steps which form the bottom surface of a major portion of the vehicle.

Still another object is to develop means for rapidly increasing water-side pressure drag of a moving marine vessel by stopping ventilation air supply to a series of enclosed hydrodynamic steps forming the bottom surface of a major central portion of the vehicle, to exert a substantial braking force on forward vessel motion.

With the foregoing objects in view, together with others which will appear as the description proceeds, the invention resides in the novel arrangement of cooperating structural and forced ventilation elements acting jointly together to develop new variable hull resistance characteristics for surface marine vessels, which will be described fully in the discussion, illustrated in the drawings, and defined in the claims.

In the drawings:

FIG. 1 is a longitudinal sectional elevation of a modified trimaran-type boat 11 of sectional design which includes a central bow section 14, starboard or right-hand longitudinal outboard hull sponson 12, port or left-hand longitudinal outboard hull sponson 13, and an elevated aft central hull section 16 disposed between the outboard sponsons 12,13. The junction plane of central bow section 14 with the aft central hull section 16 forms a primary step 15, whose large separation zone is ventilated during ahead propulsion from the discharge of supply fan 23.

FIG. 2 is a plan view of FIG. 1, with some structural elements omitted for clarity of illustration.

FIG. 3 is a frontal elevation of the boat illustrated in the views of FIGS. 1 and 2.

FIG. 4 is a fragmentary sectional view showing the primary step 15, forced ventilation supply ducts 26,27 and the lap-plate construction of the bottom surface of aft central hull section 16 to form a series of shallow multiple steps 29 downstream of the primary hull step 15.

The embodiments of FIGS. 1, 2 and 3 disclose a modified tri-maran type semi-planing boat of sectional design which employs the teachings of the invention. Outboard hull sponsons 12,13 have large length-to-width aspect ratios and relaively narrow widths, and provide substantial buoyant support for the craft. Central bow section 14 and aft central hull section 16 are disposed between outboard hull sponsons 12,13. The entire hull assembly comprised of outboard hull sections 12 and 13, central bow section 14, and aft central hull section 16 are joined together to form a rigid hull structure.

The lateral junction plane where central bow section 14 abuts aft central hull section 16 forms a primary lateral hydrodynamic step 15 of substantial depth. The bottom surface of aft central hull section 16 is substantially higher than the lower transverse edge of step 15, and is normally immersed in water to a shallow depth during operation. The lower keels of outboard hull sponsons 12,13 project substantially below the lower transverse edge of step 15 and the bottom surface of aft central hull section 16. The lower keel portions of outboard hull sponsons 12,13 taken with lateral hydrodynamic step 15 enclose an open-channel conduit for the passage of fluids below the bottom surfaces of aft central hull section 16.

Semi-planing boat 11 is propelled by twin propellers 18, one of each being installed downstream of the trailing ends of outboard hull sponsons 12,13. The shafts of propellers 18 are each driven by similar engines 17, one of each being installed within the respective aft sections of outboard hull sponsons 12,13 as shown. The craft is steered by angular adjustments of rudders 19, which are respectively disposed in the downstream discharge of propellers 18.

When boat 11 is traveling ahead, the large separation zone abaft primary lateral step 15 is ventilated by a pressurized air stream from the discharge of motor-driven supply fan 23. Incoming air flows into plenum 22 from inlet louver 21, and flows through the impeller of motor-driven axial supply fan 23. The pressurized air stream next flows past open butterfly valve 25 within conduit 24, and on into branch distribution conduits 26,27. The ventilation air is discharged into the separation zone of step 15, to form a lateral dynamic plenum 20 of substantial dimensions. Lateral dynamic plenum 20 is filled with ventilation air during drag reduction operations in ahead propulsion. Ventilation air supplied by fan 23 to dynamic plenum 20 occupies the lateral separation zone of step 15, where a substantial water-side pressure drag resistance would otherwise occur in the absence of forced separation zone ventilation.

FIG. 4 is a fragmentary sectional view showing the supply of forced ventilation air abaft step 15 from branch distribution conduits 26,17 into dynamic plenum 20, and into the water flowing beneath the bottom surface of aft central hull section 16. The bottom surface of aft central hull section 16 is formed by joining a substantial series of lapped plates 28 together in a shingling arrangement, as shown in FIG. 4. This lap-plate construction forms a series of shallow multiple steps 29, having their bluff trailing surfaces facing aft. During drag reduction operations in ahead propulsion, forced ventilation air flows rearward from lateral dynamic plenum 20 to cover the bottom surfaces of lapped plates 28 with a thick continuous layer of air bubbles 30. A small portion of the flowing air bubble layer 30 lingers within the low-pressure regions in separation zones abaft shallow steps 29 of lapped plates 28, to relieve or prevent development of substantial water-side pressure drag resistances on the bottom surfaces of aft central hull section 16.

When it is desired to slow or brake the vessel's forward speed to a slower safe speed, butterfly valve 25 within conduit 24 is closed, and air supply fan 23 may either be stopped or have its discharge flow diverted to atmosphere. Stoppage of forced ventilation air supply to the large separation zone 20 of lateral step 15 causes a large water-side pressure drag resistance to develop abaft step 15, and a multiple series of smaller water-side pressure drag resistances to develop abaft steps 29 of lapped plates 28. This greatly increased water-side pressure drag of the unventilated multiple-step series 15,29 on the bottom surfaces of aft central hull section 16 causes the vessel's forward speed to rapidly slow to a slower safe speed.

Absolute velocity pressure in lateral dynamic plenum 20 is proportional to the square of the vessel's velocity in accordance with Toricelli's theorem, when semi-planing boat 11 is being propelled ahead. Absolute pressure in lateral dynamic plenum 20 may or may not be counteracted by the sum of absolute atmospheric pressure and hydrostatic pressure at the immersion depth. The pressure head developed by supply fan 23 must also include friction losses within ventilation system conduits.

As an example, if semi-planing boat 11 operated in sea water with a 3-inch ventilation conduit friction loss and a 10-inch immersion depth of lateral dynamic plenum 20, vessel speed may be estimated at which supply fan 23 operates with 0" H$_2$O total static pressure. Assuming absolute atmospheric pressure at 34.0' H$_2$O and conduit friction loss plus immersion depth equals 13" H$_2$O, a total of 421" H$_2$O is the total pressure to be neutralized in lateral dynamic plenum 20 (which must be equaled by the absolute velocity pressure). 421" H$_2$O is equivalent to about 34.20' sea water, which is the required velocity pressure of semi-planing boat 11 as it moves ahead in sea water. Vessel forward speed may then be calculated as about 46.93 fps (equivalent to about 27.8 knots). At a vessel speed of about 27.8 knots or more, supply fan 23 would operate without a positive static pressure requirement, whereas at speeds below about 27.8 knots supply fan 23 must develop a positive static pressure. In practice, the vessel's propelling means would have to propel the craft at about 27.8 knots with the central bow section 14 substantially riding onto lateral step 15, before the full benefits of forced ventilation were achieved.

We may also estimate the capacity requirement of supply fan 23 to maintain a selective average thickness of the air bubble layer flowing adjacent the bottom surfaces of aft central hull section 16, for a designed vessel speed. As an example, for a vessel speed of 30 knots (50.63 fps), 7-foot width of aft central hull section 16, and a unitary average air bubble layer depth in inches, a supply fan 23 capacity requirement may be computed as about 1770 cfm per inch of air bubble layer depth. Maintenance of a conservative 4" air bubble layer depth in the open-channel conduit would then require a ventilation air supply of about 7080 cfm.

It should be emphasized that efficient function of this variable hull resistance invention in both the vessel drag-reduction and vessel braking operational modes requires that multiple steps 15,29 be enclosed within an open-channel conduit under the bottom surface of a marine vessel. This open-channel conduit is defined by the boundaries of lateral hydrodynamic step 15 and the inboard surfaces of outboard hull sponsons 12,13.

Teachings of the present invention may be utilized in developing variable hull resistance systems with forced ventilation for large high-speed marine vessels. Outboard hull sponsons 12,13 should have a large length-to-width aspect ratio and their outer water-side surfaces finished as smoothly as posible, to limit flow separation and wake formation (with the resultant pressure drag). The visible wake formed by the substantial emulsion of air-and-water in the upper layers of waters discharged at the stern of aft central hull section 16 is beneficial, since it can provide visual evidence of the effectiveness of forced ventilation drag reduction during vessel ahead propulsion.

From the foregoing it will be perceived by those skilled in the marine propulsion and vessel design arts that the present invention provides effective means for developing variable hull resistance methods which are beneficial to the operation of marine vessels.

While I have shown and described specific embodiments of the present invention, it will be understood by those skilled in the arts to which the invention appertains that I do not wish to be limited exactly thereto, since various modifications to the arrangements disclosed herein may be made, without departing from the scope of the invention as defined in the appended claims.

I claim:

1. A variable water-side flow resistance system to enhance and control forward movement of buoyantly-supported marine vessels comprising an open-channel conduit bounded by lower portions of the vessel's hull, for the passage of fluids thereunder; said open-channel conduit boundaries comprised by a primary hydrodynamic step having bluff trailing surfaces at the after end of a contoured central bow section which is disposed adjacent the forward end of a shallower-draft aft central hull section, said central bow section and said aft central hull section disposed between adjacent elongate outboard hull sponsons whose lower portions project below said primary step of said central bow section and below said aft central hull section; said elongate outboard hull sponsons providing substantial buoyant support for said marine vessel; said aft central hull section having a shingled bottom surface forming a series plurality of secondary hydrodynamic steps with bluff trailing surfaces; means for propelling said marine vessels; and means for selectively supplying ventilation air under said aft central hull section into the water-side separation zone abaft said primary hydrodynamic step to occupy the separation zone and form an air-filled dynamic plenum during planing or semi-planing operations in ahead vessel propulsion, the ventilation air being discharged from the air-filled dynamic plenum to flow downstream adjacent the said series plurality of secondary hydrodynamic steps in the bottom surfaces of said aft central hull section as a thick layer of air bubbles which occupies the separation zones thereof; whereby total water-side pressure drag resistance of the vessel's hull may be substantially reduced when the said ventilation air supply occupies the separation zones of said primary and secondary hydrodnamic steps, and total water-side pressure drag resistance of the vessel's hull may be substantially increased to exert strong braking forces against forward vessel motion when the said ventilation air supply is shut off.

2. A variable water-side flow resistance system to enhance and contral forward motion of buoyantly-supported marine vessels comprising an open-channel conduit bounded by lower potions of the vessel's hull, for the passage of navigable waters thereunder; said open-channel conduit boundaries comprised by a primary hydrodynamic step having bluff trailing surfaces at the after end of a contoured central bow section which is disposed adjacent the forware end of a shallower-draft aft central hull section, said central bow section and said aft central hull section disposed between adjacent elongate outboard hull sponsons whose lower portions project below said primary step of said central bow section and below said aft central hull section; said elongate outboard hull sponsons providing substantial buoyant support for said marine vessel; said aft central hull section having a shingled bottom surface forming a series plurality of secondary hydrodynamic steps with bluff trailing surfaces; means for propelling said marine vessel; a fluid pump having air inlet means which is disposed to selectively supply pressurized atmospheric air; and conduit means communicating between the outlet of said fluid pump and the water-side separation zone abaft said primary hydrodynamic step, under the bottom of said aft central hull section; ventilation air supplied by said fluid pump occupying the water-side separation zone of said primary step to form an air-filled dynamic plenum during planing or semi-planing operations in ahead vessel propulsion, ventilation air being discharged from the air-filled dynamic plenum to flow downstream adjacent the said series plurality of secondary hydrodynamic steps in bottom surfaces of said aft central hull section as a thick layer of air bubbles which occupies the separation zones thereof; whereby total water-side pressure drag resistance of the vessel's hull may be substantially reduced when said ventilation air substantially occupies the separation zones of said primary and secondary hydrodynamic steps, and total water-side pressure drag resistance of the vessel's hull may be substantially increased to exert strong braking forces against forward vessel motion when the ventilation air supply from said fluid pump is stopped.

3. The variable water-side flow resistance system for marine vessels of claim 2 wherein valve means are disposed within said discharge conduit means of said fluid pump to control ventilation air supply into the water-side separation zone abaft said primary hydrodynamic step.

4. A method for reducing water-side fluid resistance to ahead travel of a buoyantly-supported, planing or semi-planing marine vessel having an open-channel conduit formed by lower portions of the vessel's hull for the passage of navigable waters thereunder, the leading end of said open-channel conduit defined by a primary hydrodynamic step having bluff trailing surfaces, side boundaries of said open-channel conduit defined by inboard surfaces on lower portions of elongate outboard hull sponsons, and the upper portion of said open-channel conduit defined by shingled bottom surfaces of said marine vessel comprised of a series plurality of secondary hydrodynamic steps having bluff trailing surfaces, comprising: channeling the flow of navigable waters under said marine vessel to pass over surfaces of said primary hydrodynamic step and into said open-channel conduit; ventilating the water-side separation zone abaft said primary hydrodynamic step with an atmospheric air stream which occupies the separation zone and forms an air-filled dynamic plenum abaft said primary hydrodynamic step; and flowing ventilation air discharged from said air-filled dynamic plenum abaft said primary hydrodynamic step as an air-water mixture having a thick upper layer of air bubbles which moves downstream adjacent surfaces of said series plurality of secondary hydrodynamic steps; so that ventilation air bubbles occupy water-side separation zones of said series plurality of secondary hydrodynamic steps.

5. A method for increasing water-side fluid resistance to ahead travel of a buoyantly-supported, planing or semi-planing marine vessel having an open-channel conduit formed by lower portions of the vessel's hull for the passage of navigable waters thereunder, the leading end of said open-channel conduit defined by a primary hydrodynamic step having bluff trailing surfaces, side boundaries of said open-channel conduit defined by inboard surfaces on lower portions of elongate outboard hull sponsons, and the upper portion of said open-channel conduit defined by shingled bottom surfaces of said marine vessel comprised of a series plurality of secondary hydrodynamic steps having bluff trailing surfaces, comprising: channeling the flow of navigable waters under said marine vessel to pass over surfaces of said primary hydrodynamic step and into said open-channel conduit; ventilating the water-side separation zone abaft said primary hydrodynamic step with an atmospheric air stream which occupies the separation zone and forms an air-filled dynamic plenum abaft said primary hydrodynamic step; flowing ventilation air discharged from said air-filled dynamic plenum abaft said primary hydrodynamic step as an air-water mixture having an upper layer of air bubbles which moves downstream adjacent surfaces of said series plurality of secondary hydrodynamic steps; and throttling the flow of ventilation air discharged into the water-side separation zone abaft said primary hydrodynamic step; whereby the total water-side pressure drag resistance of the vessel's hull may be increased to exert braking forces against forward vessel travel, as the flow of ventilation air into water-side separation zones of said primary and secondary hydrodynamic steps is lessened or stopped.

* * * * *

UNITED STATES PATENT AND TRADEMARK OFFICE
CERTIFICATE OF CORRECTION

PATENT NO. : 4,926,771

DATED : May 22, 1990

INVENTOR(S) : Francis R. Hull

It is certified that error appears in the above-identified patent and that said Letters Patent is hereby corrected as shown below:

Column 7, line 5, change "vessels" to --vessel;--.

Column 7, line 9, change "forware" to --forward--.

Signed and Sealed this

Seventeenth Day of March, 1992

Attest:

HARRY F. MANBECK, JR.

*Attesting Officer*     *Commissioner of Patents and Trademarks*